E. A. LESTER.
Car Wheel.

No. 25,020. Patented Aug. 9, 1859.

Witnesses:

Inventor:

UNITED STATES PATENT OFFICE.

EBENEZER A. LESTER, OF BOSTON, MASSACHUSETTS.

RAILROAD-CAR WHEEL.

Specification of Letters Patent No. 25,020, dated August 9, 1859.

*To all whom it may concern:*

Be it known that I, EBENEZER A. LESTER, of Boston, in the county of Suffolk and State of Massachusetts, have invented certain new and useful Improvements in Railroad-Car Wheels, of which the following is a full, clear, and exact description, reference being had to the accompanying drawings, making part of this specification, in which—

Figure 4:
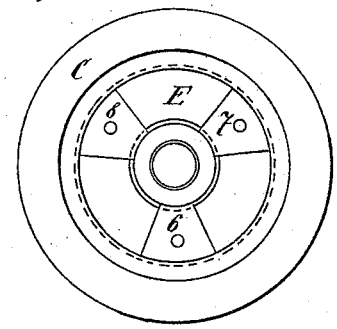
Figure 1:
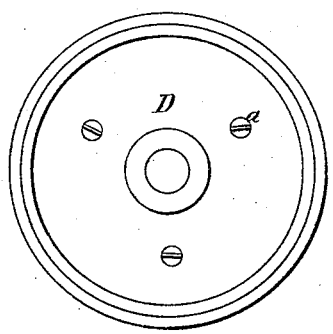
Figure 2:
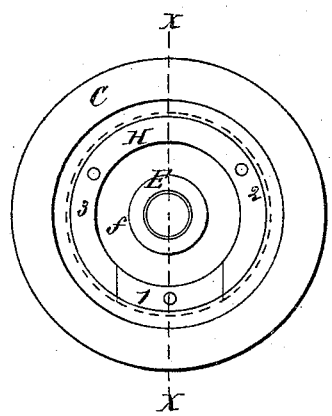
Figure 3:
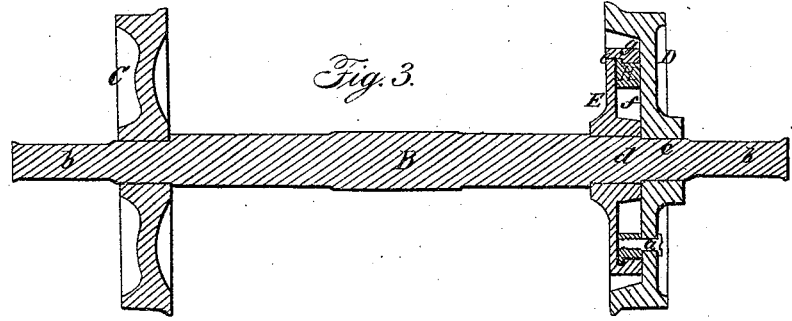

Figure 1 is an elevation showing one of a pair of car wheels; Fig. 2, an elevation with part of one wheel removed; Fig. 3 a section on the line $x$, $x$, extending longitudinally through the axle; Fig. 4 detail to be referred to hereafter.

Rail road car wheels as ordinarily constructed are attached in pairs rigidly to an axle which has its bearings at each end in suitable boxes secured to the car or truck; this arrangement answers well on a straight track, but in turning curves where one wheel of the pair is naturally required to revolve faster than the other, a considerable amount of torsion is put upon the axle. To remedy this difficulty, various plans have been devised, but none of them with which I am acquainted have combined the desired end of allowing an independent motion to each wheel with a secure and durable attachment of the wheels to their axle.

To accomplish this end, viz. allowing an independent movement to each wheel of a pair, at the same time that they are securely attached to the axle, is the object of my present invention, which consists in a peculiar manner of attaching the wheels to their axle, as will now be more fully described in such a manner that others skilled in the art may understand and use my invention.

Figure 5:
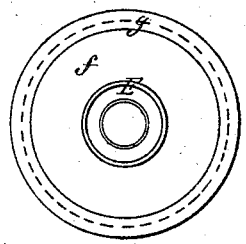

In the drawings B is the axle which has its bearings at $b$. The wheel C is of the ordinary construction and is rigidly secured to the axle. The other wheel D, which shows my improved method of attachment, has a flanch and tread of the usual form, and runs loosely on the axle B, at $c$, but is securely connected therewith in the following manner: An auxiliary hub or disk E (shown detached in Fig. 5) is rigidly secured to the axle B at $d$, its face next to the wheel D is recessed as shown at $f$, and the rim $g$ is undercut forming a groove $e$, around it on the inner side. A ring H, formed in segments 1, 2, 3 (Fig. 2) is of a proper diameter to fit when in place within the rim $g$ of the disk E, it also has formed on its periphery a flanch which fills the groove $e$. After the segments of the ring H have been inserted in place the wheel D, is secured thereto by screw bolts $a$, passing through the wheel into each segment. The wheel D, and disk E, are thus securely connected together, while the wheel D, is free to revolve on the axle B, the ring H turning freely in the recess $f$, which it cannot leave while the flanch on it is in the groove $e$. Instead of a complete circle or ring H, of segments, several segmental blocks may be used as shown at 6, 7, 8, Fig. 4. Both wheels of the pair may be attached to the axle in this manner, or one of them may be rigidly secured to it as at C, Fig. 3.

What I claim as my invention and desire to secure by Letters Patent is—

Attaching the wheel D, to its axle by means of the auxiliary hub E, with its recess $f$, and groove $e$, and the segmental ring H, or its equivalent connected with the wheel in the manner substantially as set forth.

EBEN. A. LESTER.

Witnesses:
 THOS. R. ROACH,
 P. E. TESCHAMACHER.